No. 745,688. PATENTED DEC. 1, 1903.
A. L. SWARTZ.
MULTIPLYING ATTACHMENT FOR CAMERAS.
APPLICATION FILED APR. 9, 1903.
NO MODEL.
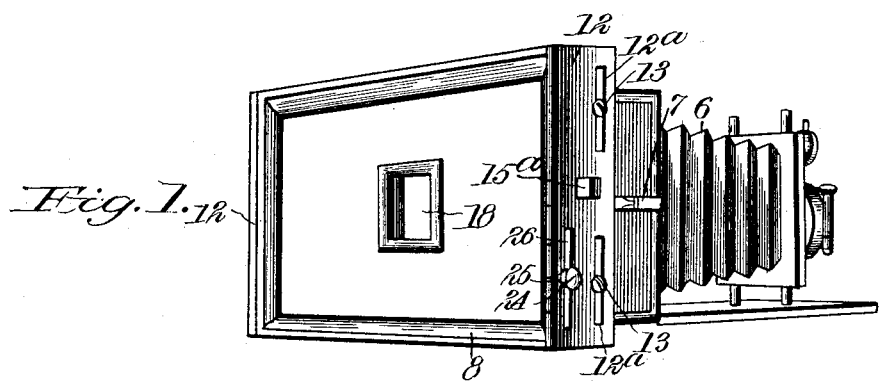
Fig. 1.
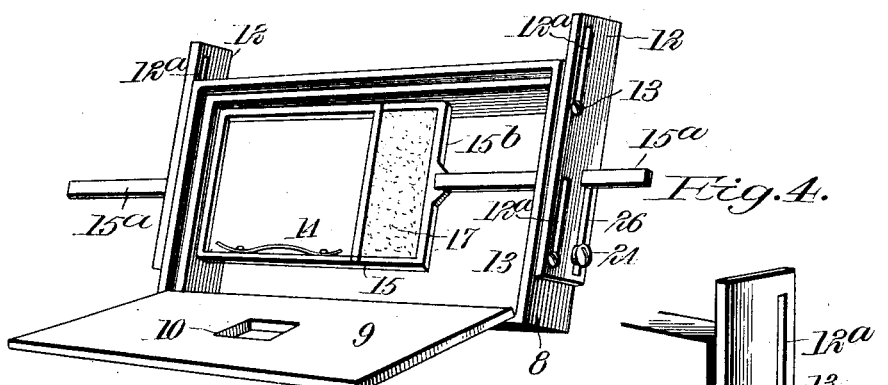
Fig. 2.
Fig. 3.
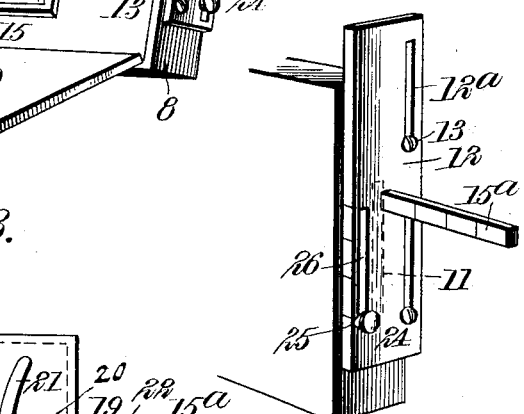
Fig. 4.
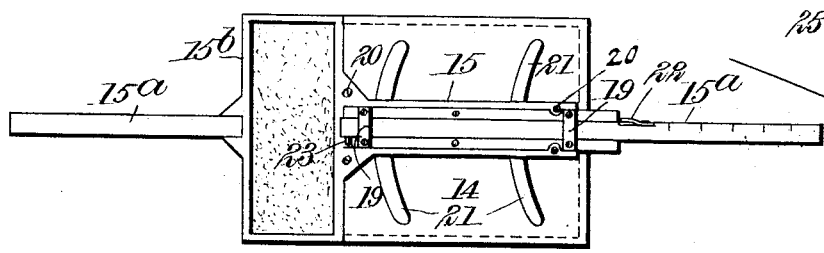
Witnesses
C. H. Walker
Geo. E. Few
Inventor
Albert L. Swartz
By Milo B. Stevens & Co.
Attorneys No. 745,688. Patented December 1, 1903.

UNITED STATES PATENT OFFICE.

ALBERT L. SWARTZ, OF JUNCTION CITY, OREGON.

MULTIPLYING ATTACHMENT FOR CAMERAS.

SPECIFICATION forming part of Letters Patent No. 745,688, dated December 1, 1903.

Application filed April 9, 1903. Serial No. 151,795. (No model.)

*To all whom it may concern:*

Be it known that I, ALBERT L. SWARTZ, a citizen of the United States, residing at Junction City, in the county of Lane and State of Oregon, have invented certain new and useful Improvements in Multiplying Attachments for Cameras; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention comprises a multiplying attachment for cameras, the object being to form an improved device for taking a number of photographs on a single plate without removal of the plate.

The invention comprises devices whereby the plate may be manipulated to expose successive parts thereof in both directions, so that several rows of several pictures in each row may be made.

A further object of the invention is to produce an improved plate-holder having a ground glass attached thereto, so that the plate may be focused without the insertion and removal of a separate ground glass.

The device is adapted for use on cameras of various kinds, so that a person owning a camera may by the use of the device take what are known as "stamp-photographs" with facility.

In the accompanying drawings, Figure 1 is a perspective view of the device applied to a camera. Fig. 2 is a front perspective view of the multiplying attachment with the lid open. Fig. 3 is a rear view of the plate-holder and its operating-rods removed from the casing, and Fig. 4 is a perspective end view of the attachment.

Referring specifically to the drawings, 6 indicates an ordinary folding camera, to the box of which my attachment is applied by suitable clamps, (indicated at 7.) The multiplying attachment includes a rectangular box, (indicated at 8,) and its cover 9 has an opening 10, through which the exposure is made. This box is clamped to the rear of the camera in proper position to receive the rays forming the image through the opening 10. Each end of the box is slotted, as indicated in dotted lines at 11, and has thereon sliding gage-plates 12, which slide vertically on screws 13, which extend through slots $12^a$ in the gage-plates. The plates cover the slots 11, so that light will not leak through.

At 14 is indicated a plate-holder supported on a back plate 15, from which project gage-rods $15^a$, which extend through the slots 11 and at a nice fit through holes in the plates 12. These rods slide sidewise horizontally and shift the plate-holder accordingly, and being supported by the gage-plates 12 they are vertically movable therewith. A horizontal and vertical adjustment is thus produced, whereby any portion of the plate may be brought to register with the opening 10.

The ground glass is indicated at 17, supported in the plate-holder, and when it is brought to register with the opening 10 the device may be focused through the sight 18 at the back of the casing, which is of course closed during exposure. The back plate 15 is shaped to form at one end an open frame $15^b$ around the ground glass, so as to not interfere with focusing, and one of the rods $15^a$ is rigidly joined to this frame. The other is slidably secured to the back plate under straps 19.

The plate-holder is attached to the back plate 15 by screws 20, which work loosely through holes in the plate. Said plate also carries springs 21, which bear against the back of the plate-holder. This permits an outward movement of the plate-holder under pressure of the springs, which when the lid 9 is closed forces the plate-holder tightly against the lid, so as to exclude light from the plate.

The one rod $15^a$ has a sliding movement with respect to the plate 15, as above stated, within the straps 19, so that it may be pushed within the casing when not in use. When in use, it is drawn out until the spring-catch 22 attached thereto catches behind the end of the plate, a stop-pin at 23 limiting further movement. When so engaged, the rods and plate slide back and forth as one; but the sliding rod may be shot in by finger-pressure on the catch 22. The rods $15^a$ are graduated according to the desired number of rows of photographs one way of the sensitive plate, and the plates 12 are graduated according to the number of rows the other way. To hold the plates 12 at adjustment, thumb-screws (indicated at 24) are provided, carrying pointers 25 and working through slots 26.

In operation the plate is inserted in the plate-holder in the dark room and the lid 9 closed. The attachment is then applied to the back of the camera-box and the focus obtained on the ground glass 17. The rod $15^a$ is then moved sidewise to the first mark of its graduated scale and the gage-plates 12 adjusted vertically to expose the first division or row of the plate. The first exposure is then given, after which the rod $15^a$ is moved along to the next mark and the next exposure given, and so on until the end of the row is reached. The thumb-screws 24 are then loosened and the guide-plates shifted vertically to the next row, which are then exposed successively by similar appropriate movement of the rods $15^a$, and so on until the whole plate is covered.

What I claim as new, and desire to secure by Letters Patent, is—

1. A multiplying attachment for cameras, comprising a casing, gage-plates slidable on opposite sides thereof, a movable gage-rod supported by the plates and extending through the casing, and a plate-holder attached to the rod within the casing.

2. In a multiplying attachment for cameras, in combination, a casing, slidable gage-plates on opposite sides thereof, a rod extending across within the casing and through the said plates and slidable perpendicularly thereto, and a plate-holder attached to the rod within the casing.

3. In a multiplying attachment for cameras, in combination, a casing, a rod slidable therein, a plate-holder loosely attached to the rod and in contact with the front of the casing, and a spring between the rod and the holder, pressing the holder against the casing, substantially as described.

4. In a multiplying attachment for cameras, the combination with a casing having opposite slotted sides, and gage-plates slidable on the sides over the slots, of a rod slidably supported on said plates and extending across within the casing and through the slots, and a plate-holder carried by the rod.

5. In a multiplying attachment for cameras, the combination with a casing, of a plate-holder movable therein, and a slidable operating-rod attached to the holder and projecting through the casing and extensible with respect to the holder.

In testimony whereof I affix my signature in presence of two witnesses.

ALBERT L. SWARTZ.

Witnesses:
S. O. STARR,
W. T. LEWIS.